(12) United States Patent
Kong et al.

(10) Patent No.: US 10,198,045 B1
(45) Date of Patent: Feb. 5, 2019

(54) GENERATING FRINGING FIELD FOR WIRELESS COMMUNICATION

(71) Applicant: GOOGLE INC., Mountain View, CA (US)

(72) Inventors: Xiangyu Kong, Sunnyvale, CA (US); Doug Kough, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/217,223

(22) Filed: Jul. 22, 2016

(51) Int. Cl.
| | |
|---|---|
| *G06F 1/16* | (2006.01) |
| *H04W 4/80* | (2018.01) |
| *H04B 5/00* | (2006.01) |
| *H04B 5/02* | (2006.01) |
| *H04W 28/02* | (2009.01) |

(52) U.S. Cl.
CPC .......... *G06F 1/1698* (2013.01); *G06F 1/1654* (2013.01); *H04B 5/0031* (2013.01); *H04B 5/0081* (2013.01); *H04B 5/02* (2013.01); *H04W 4/80* (2018.02); *H04W 28/0205* (2013.01)

(58) Field of Classification Search
CPC ... G06F 1/1698; G06F 1/1654; H04B 5/0081; H04B 5/02; H04B 5/0031; H04W 28/0205; H04W 4/008
See application file for complete search history.

(56) References Cited

U.S. PATENT DOCUMENTS

| | | | |
|---|---|---|---|
| 3,575,674 A | 4/1971 | Howe | |
| 3,996,576 A | 12/1976 | Bullock et al. | |
| 4,130,822 A | 12/1978 | Conroy et al. | |
| 5,252,979 A * | 10/1993 | Nysen ................. | G01S 13/751 342/50 |
| 5,994,983 A * | 11/1999 | Andersson ........... | H01L 23/66 174/262 |
| 9,711,863 B2 * | 7/2017 | De Luis ............... | H01Q 19/005 |
| 2001/0043127 A1 * | 11/2001 | Tanji .................... | H01P 5/1022 333/26 |
| 2004/0233172 A1 * | 11/2004 | Schneider ............ | G06F 3/0202 345/168 |
| 2009/0033627 A1 * | 2/2009 | Aasen ................... | G06F 3/0221 345/168 |
| 2010/0085497 A1 * | 4/2010 | Chang .................. | G09G 3/3648 349/37 |

(Continued)

OTHER PUBLICATIONS

"Electromagnet", Wikipedia (https://en.wikipedla.org/Wiki/Electromagnet), printed May 19, 2016, 16 pages.

(Continued)

*Primary Examiner* — Lewis West
(74) *Attorney, Agent, or Firm* — Brake Hughes Bellermann LLP (57) ABSTRACT

A portable computing device may comprise a display, a frame, and a communication circuit. The frame may support the display. At least a portion of the frame may be electrically conductive, and the electrically conductive portion of the frame may define a slot. The communication circuit may be coupled to the slot. The communication circuit may be configured to generate a fringing field. The fringing field may include electromagnetic waves with a wavelength at least eight times a width of the slot in a widest direction of the slot.

16 Claims, 8 Drawing Sheets

(56) References Cited

U.S. PATENT DOCUMENTS

| | | | | |
|---|---|---|---|---|
| 2010/0231340 | A1* | 9/2010 | Fiorello | H01F 38/14 336/92 |
| 2012/0019356 | A1* | 1/2012 | Gagneraud | G06F 21/32 340/5.32 |
| 2012/0214411 | A1* | 8/2012 | Levy | H04B 5/0075 455/41.1 |
| 2013/0293430 | A1 | 11/2013 | Henty | |
| 2013/0309966 | A1 | 11/2013 | Aldana et al. | |
| 2013/0342295 | A1* | 12/2013 | Ashcraft | G08B 13/12 335/219 |
| 2014/0015730 | A1* | 1/2014 | Anguera Pros | H01Q 1/243 343/860 |
| 2015/0061953 | A1* | 3/2015 | Li | H01Q 9/0421 343/749 |
| 2015/0207213 | A1* | 7/2015 | Forslund | H01Q 1/3291 343/713 |
| 2015/0255855 | A1* | 9/2015 | Tsai | H01Q 1/273 343/702 |

OTHER PUBLICATIONS

"Battery-less Near Field Communication (NEC) Keyboard", available online at <http://www.ti.com/tool/tidm-batterylessnfckeyboard?keyMatch=Battery-less%20Near%20Field%20Communication%20(NFC)%20Keyboard&tisearch=Search-EN-Everything>, retrieved on Jan. 5, 2015, 3 pages.

"Battery-Less Near Field Communication (NEC) Keyboard", User's Guide, TIDU398, Jul. 2014, 14 pages.

"Inside NFC: How Near Field Communication Works", available online at <http://apcmag.com/inside-nfc-how-near-field-communication-works.htm/>, retrieved on Dec. 4, 2014, 12 pages.

Macias et al., "NFC Active and Passive Peer-to-Peer Communication Using the TRF7970A", Application Report, SLOA192, Apr. 2014, 38 pages.

* cited by examiner

GENERATING FRINGING FIELD FOR WIRELESS COMMUNICATION

TECHNICAL FIELD

This description relates to wireless communication

BACKGROUND

Electronic devices can communicate with each other via wireless interfaces. For example, an electronic keyboard may wirelessly communicate with portable computing devices. The wireless communications between a pair of devices may interfere with wireless communications between other pairs of devices. In addition to interference with other devices, self-interference or desense (radio desensitization) can also occur with a wireless communication link.

SUMMARY

According to one example, a portable computing device may comprise a display, a frame, and a communication circuit. The frame may support the display. At least a portion of the frame may be electrically conductive, and the electrically conductive portion of the frame may define a slot. The communication circuit may be coupled to the slot. The communication circuit may be configured to generate a fringing field. The fringing field may include electromagnetic waves with a wavelength at least eight times a width of the slot in a widest direction of the slot.

According to another example, a portable computing device may comprise a display, a frame, a communication circuit, and a transceiver. The frame may surround the display. The communication circuit may be included in the frame. The communication circuit may be configured to modulate signals onto electromagnetic waves. The transceiver may be included in the frame and may be coupled to the communication circuit. The transceiver may be configured to transmit the electromagnetic waves with the modulated signals. The transceiver may have a width in a widest direction that is no more than an eighth of a wavelength of the electromagnetic waves.

According to another example, a method may include modulating baseband signals onto an electromagnetic wave, and generating a fringing field. The fringing field may carry the modulated signals.

The details of one or more implementations are set forth in the accompanying drawings and the description below. Other features will be apparent from the description and drawings, and from the claims.

DETAILED DESCRIPTION

A portable computing device may be mounted onto a base. The base may include a keyboard and/or trackpad for a user to provide keyboard and/or tactile input. The portable computing device and base may communicate with each other by coupled fringing fields. The portable computing device and base may generate the fringing fields by transceivers that have widths and/or lengths that are less than, or no more than, one-eighth of the wavelength of the signals that the portable computing device and base are transmitting. The small lengths and/or widths of the transceivers may cause the signals generated by the portable computing device and base to be attenuated, rather than radiating and interfering with other communication signals. The attenuation of the signals may reduce the range of the signals, preventing the signals from interfering with other signals transmitted and/or received by the portable computing device, base, and/or other devices. The attenuation may allow the portable computing device and base to communicate via any frequency including licensed frequency bands such as one Gigahertz (1 GHz), which would violate regulatory requirements if radiated without attenuation. The transceivers may be slots, loops, or probes.

Figure 1A:
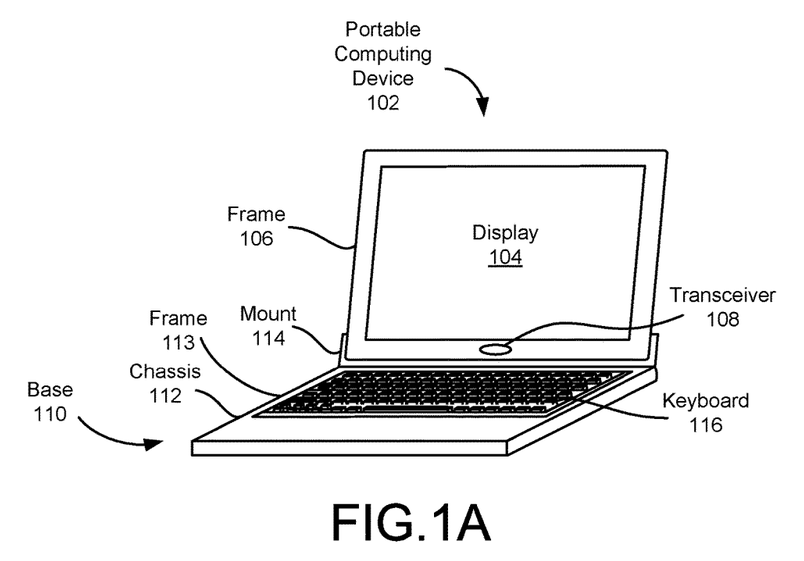
FIG. 1A is a perspective view of a portable computing device and a base for mounting the portable computing device according to an example implementation.

FIG. 1A is a perspective view of a portable computing device 102 and a base 110 for mounting the portable computing device 102 according to an example implementation. The portable computing device 102 may include a display 104 for displaying graphical content, and a frame 106 supporting the display 104. The display 104 may include a touchscreen which also receives tactile input, or may only provide output. The portable computing device 102 may include a tablet computer, a desktop computer with a built-in display, a smartphone, or a display, as non-limiting examples.

The portable computing device 102 may also include a transceiver 108 for sending and/or receiving signals to and/or from the base 110. The transceiver 108 may include a slot defined by the frame 106 (which may be electrically conductive such as made of metal), a probe, or a loop. The transceiver 108 may have a width at a greatest distance that is no more than one-eighth of a wavelength of signals transmitted via the transceiver 108, such as one-eighth of a wavelength or one-tenth of a wavelength, attenuating the signals so that communication occurs in a very close range and the signals do not interfere with signals transmitted between other pairs of devices and regulatory requirements are not violated.

The base 110 may include a frame 113. The frame 113 may include a mount 114 and a chassis 112. The mount 114 may be rotatably attached to the chassis 112. The mount 114 may support the portable computing device 102. The support of the portable computing device 102 by the mount 114, and the rotatable attachment of the mount 114 to the chassis 112, may allow a user to rotate the display 104 with respect to the chassis 112 (which may rest on a flat surface such as a table). The mount 114 may support the portable computing device 102 by, for example, magnets.

The chassis 112 may support a keyboard 116. The keyboard 116 may receive alphanumeric, symbol, and/or modifier key input. The base 110 may also include a transceiver 118 (not shown in FIG. 1A). The transceiver 118 may transmit signals indicating keyboard input from the keyboard 116 to the portable computing device 102, and/or receive signals from the transceiver 108 of the portable computing device 102.

Figure 1B:
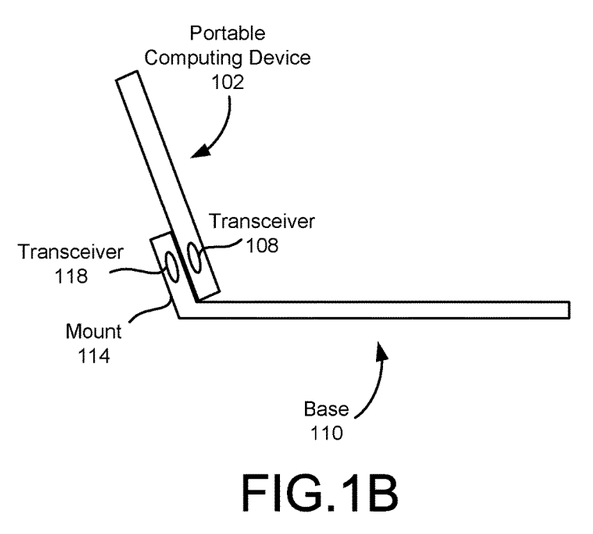
FIG. 1B is a side view of the portable computing device and the base for mounting the portable computing device according to an example implementation.
Figure 4A:
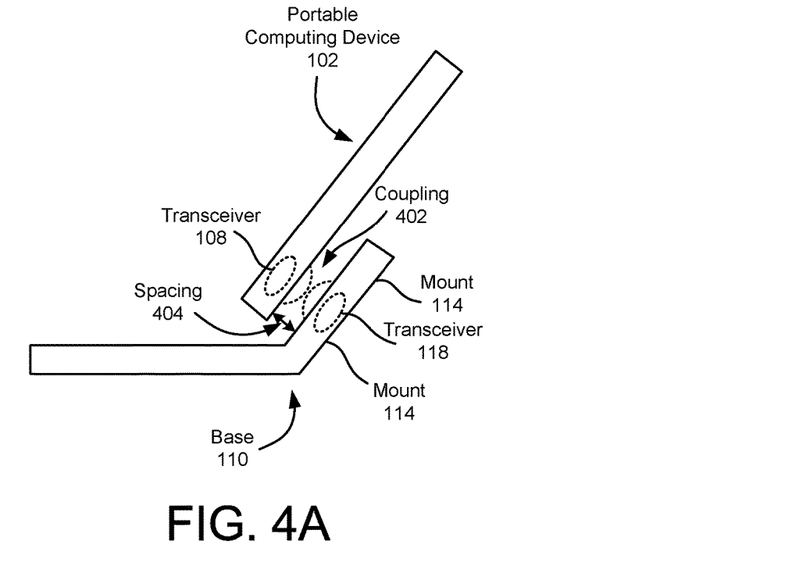
FIG. 4A shows coupling of transceivers of the portable computing device and the base according to an example implementation.

FIG. 1B is a side view of the portable computing device 102 and the base 110 for mounting the portable computing device 102 according to an example implementation. As shown in FIG. 1B, the transceiver 118 may be included in the mount 114 of the base 110. When the portable computing device 102 is mounted on the mount 114, the transceiver 108 of the portable computing device 102 may be aligned with and/or proximal to the transceiver 118 of the base 110, allowing the attenuated signals generated by the transceivers 108, 118 to be received, demodulated, and/or processed by the other transceiver 108, 118. The transceivers 108, 118 may be located at various locations in the respective frames 106, 113, as long as the transceivers 108, 118 will overlap when the portable computing device 102 is placed onto the mount 114 so that the fringing fields generated by the transceivers 108, 118 may couple, as shown in FIG. 4A.

Figure 2:
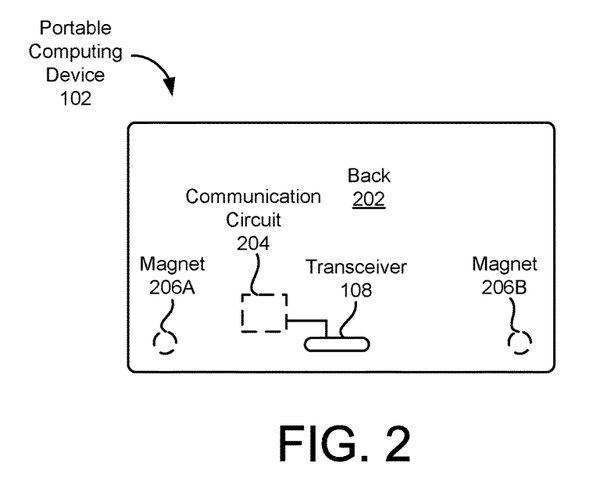
FIG. 2 shows the portable computing device according to an example implementation.

FIG. 2 shows the portable computing device 102 according to an example implementation. FIG. 2 shows a back 202 of the portable computing device 102, opposite from a front side (not labeled) which includes the display 104, facing the viewer.

The back 202 of the portable computing device 102 may include the transceiver 108. The transceiver 108 may be included in a lower portion of the portable computing device 102, on the back 202 of the portable computing device 102 (and/or on an opposite side of the portable computing device 102 from the display 104) which will be in contact with the mount 114 of the base 110. Including the transceiver 108 in the lower portion of the portable computing device 102 that will be in contact with the mount 114 will allow the transceiver 108 of the portable computing device 102 to be proximal to the transceiver 118 of the base 110.

The portable computing device 102 may include a communication circuit 204. The communication circuit 204 may be electrically connected to the transceiver 108. The communication circuit 204 may generate and/or modulate signals, which may be in the form of electromagnetic waves, for transmission by the transceiver 108, and/or process and/or demodulate signals received by the transceiver 108. The communication circuit 204 may, for example, modulate baseband signals onto an electromagnetic wave. To generate fringing fields which will have a short range and/or will not radiate a significant distance from the transceiver 108, the communication circuit 204 may generate signals (such as an electromagnetic wave) with a carrier wavelength at least eight times, such as eight times or ten times, a width of the transceiver 108 in a widest direction of the transceiver 108. In an example of signals with a carrier frequency of one Gigahertz (1 GHz), the width of the transceiver 118 in the greatest direction may be no more than thirty-seven and one-half millimeters (37.5 mm), such as less than fifteen millimeters (15 mm) and/or less than five millimeters (5 mm).

The portable computing device 102 may include one or more magnets 206A, 206B. The magnets 206A, 206B may couple to magnets 304, 306 (shown in FIG. 3) included in the mount 114 of the base 110, securing the portable computing device 102 in the desired position on the mount 114.

Figure 3:
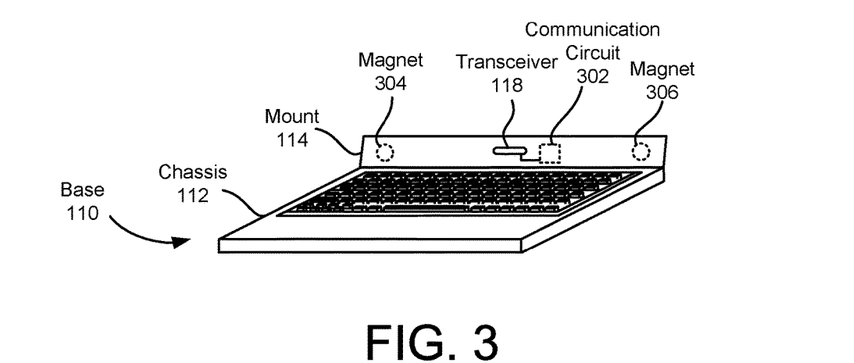
FIG. 3 shows the base according to an example implementation.

FIG. 3 shows the base 110 according to an example implementation. The base 110 may include the transceiver 118. The transceiver 118 may transmit signals indicating keyboard input from the keyboard 116 to the portable computing device 102, and/or receive signals from the transceiver 108 of the portable computing device 102.

The base 110 may include a communication circuit 302. The communication circuit 302 may be electrically connected to the transceiver 118. While FIG. 3 shows the communication circuit 304 as being included in the mount 114, the communication circuit 302 may also be included in the chassis 112, as long as the communication circuit 302 is electrically connected to the transceiver 118.

The communication circuit 302 may generate and/or modulate signals, which may be in the form of an electromagnetic wave, for transmission by the transceiver 118, and/or the communication circuit 302 may process and/or demodulate signals received by the transceiver 118. To generate fringing fields which will have a short range and/or will not radiate a significant distance from the transceiver 118, the communication circuit 302 may generate signals with a carrier wavelength at least eight times, such as eight times or ten times, a width of the transceiver 118 in a widest direction of the transceiver 118. In an example of signals with a carrier frequency of one Gigahertz (1 GHz), the width of the transceiver 118 in the greatest direction may be no more than thirty-seven and one-half millimeters (37.5 mm), such as less than fifteen millimeters (15 mm) and/or less than five millimeters (5 mm).

The mount 114 of the base 110 may include one or more magnets 304, 306. The magnets 304, 306 may be aligned with positions of the magnets 206A, 206B on the portable computing device 102. When the portable computing device 102 is placed onto the mount 114, the magnets 304, 306 may couple to the magnets 206A, 206B, securing the portable computing device 102 to the mount 114. The force of attraction between the pairs of magnets 304, 306, 206A, 206B may be greater than the force of gravity on the portable computing device 102, preventing the portable computing device 102 from separating from the mount 114 until a user pulls the portable computing device 102 from the mount 114.

FIG. 4A shows coupling of transceivers 108, 118 of the portable computing device 102 and the base 110 according to an example implementation. As shown in FIG. 4A, when the portable computing device 102 is placed onto the mount 114, and/or when the transceivers 108, 118 are proximal to each other, the transceivers 108, 118 may form a coupling 402 with each other. The coupling 402 between the transceivers 108, 118 may allow the transceivers 108, 118 to send and receive signals to and from each other, with the signals not reaching other devices. The strength of the coupling 402 may be inversely proportional to a spacing 404 between the portable computing device 102 and the mount 114 and/or between the transceivers 108, 118.

Figure 4B:
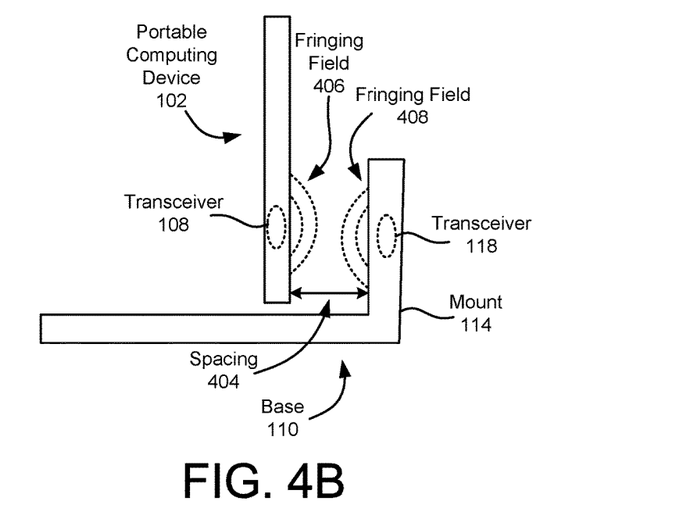
FIG. 4B shows fringing fields generated by the transceivers of the portable computing device and the base according to an example implementation.

FIG. 4B shows fringing fields 406, 408 generated by the transceivers 108, 118 of the portable computing device 102 and the base 110 according to an example implementation. As shown in FIG. 4B, the transceiver 108 may generate the fringing field 406 which extends only a small distance from the transceiver 108 due to the small width of the transceiver 108 compared to the wavelength of the signals being sent by the transceiver 108, and the transceiver 118 may generate the fringing field 408 which extends only a small distance from the transceiver 118 due to the small width of the transceiver 118 compared to the wavelength of the signals being sent by the transceiver 118. The strength of the respective fringing fields 406, 408 may be inversely proportional to the square of the spacing 404 between the portable computing device 102 and mount 114 and/or between the transceivers 108, 118, and/or inversely proportional to the distance from the respective transceiver 108, 118.

Figure 5A:
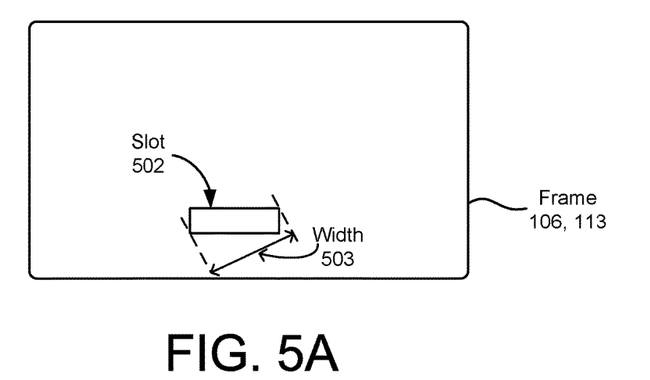
FIG. 5A shows an example implementation in which a transceiver is a slot.

FIG. 5A shows an example implementation in which a transceiver is a slot 502. The slot 502 may be an example of either transceiver 108, 118, and may be included in an electrically conductive portion of either frame 106, 113, which may be made of metal. The slot 502 may be an empty space in the conductive frame 106, 113, and the width 503, which should be a fraction of the wavelength of the transmitted signal (such as no more than one-eighth of the wavelength), may be measured based on the length of the slot 502 in a longest direction between portions of the slot 502. In an example of signals with a carrier frequency of one Gigahertz (1 GHz), the width of the slot 502 in the greatest direction may be no more than thirty-seven and one-half millimeters (37.5 mm), such as less than fifteen millimeters (15 mm) and/or less than five millimeters (5 mm). In an example implementation, the slot 502 may be three to four millimeters (3-4 mm) by about one millimeter (1 mm) (such as between 0.8 mm and 1.2 mm).

Figure 5B:
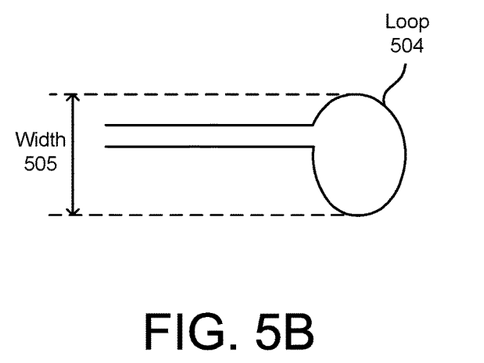
FIG. 5B shows an example implementation in which a transceiver is a loop.

FIG. 5B shows an example implementation in which a transceiver is a loop 504. The loop 504 may be an example of either transceiver 108, 118, and may be a shape of a metal wire (such as a wire loop), etched wire, or other conductive material. The loop 504, may be circular, semicircular, oval-shaped, or irregularly shaped. The width 505, which should be a fraction of the wavelength of the transmitted signal (such as no more than one-eighth of the wavelength), may be measured as a longest diameter of the loop 504.

Figure 5C:
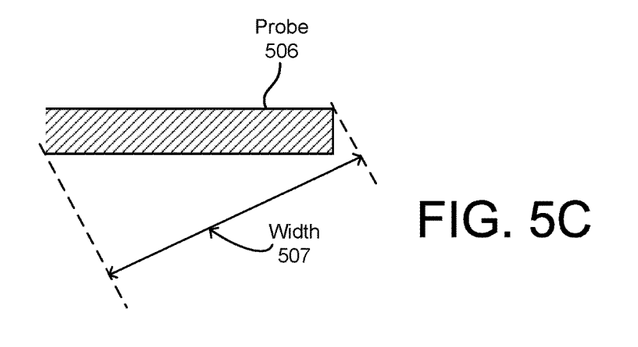
FIG. 5C shows an example implementation in which a transceiver is a probe.

FIG. 5C shows an example implementation in which a transceiver is a probe 506. The probe 506 may be an example of either transceiver 108, 118. The probe 506 may be a conductive, solid material, such as metal or etched conductor. The width 507, which should be a fraction of the wavelength of the transmitted signal (such as no more than one-eighth of the wavelength), may be a length of the probe 506 in a longest direction between portions of the probe 506.

Figure 6:
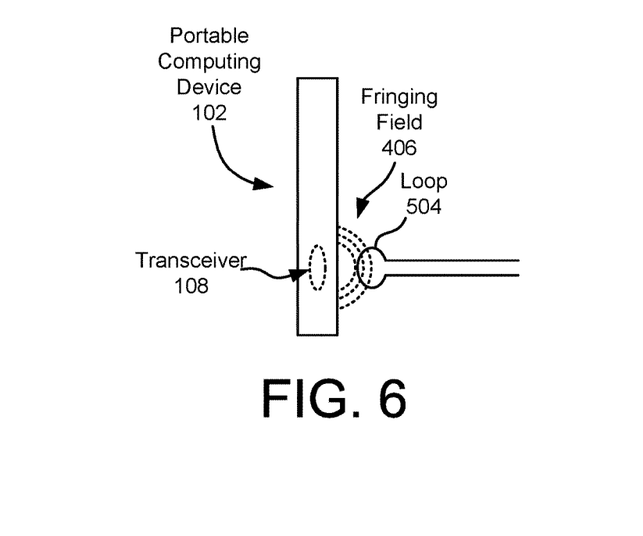
FIG. 6 shows an alignment of transceivers according to an example implementation.

FIG. 6 shows an alignment of transceivers according to an example implementation. In this example, the transceiver 108 included in the portable computing device 102 is a slot extending toward and away from the viewer, and the transceiver of the mount 114 (not shown in FIG. 6) is the loop 504 extending up and down the page. The perpendicular extensions of the transceivers, and/or of the loop 504 with respect to the slot transceiver 108, may maximize the reception by the loop 504 of the fringing field 406 generated by the transceiver 108.

Figure 7:
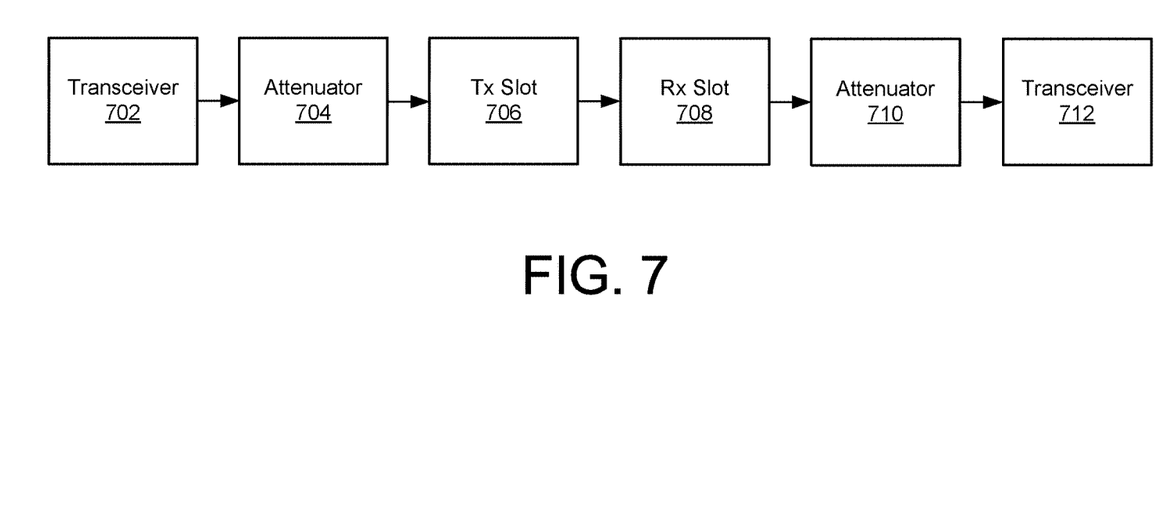
FIG. 7 shows a flow of signals according to an example implementation.

FIG. 7 shows a flow of signals according to an example implementation. In this example, a transceiver 702, which may include the communication circuit 302 of the mount 114 of the base 110, may generate a signal. At generation, there is no attenuation.

The transceiver 702 may modulate and/or send the signal to the transmission slot 706, such as the transceiver 118, via an attenuator 704. The attenuator 704 may include resistance in the wires between the transceiver 702 and the transmission slot 706, or an active attenuator which reduces the strength of the signal.

Upon transmission of the signal from the transmission slot 706 to a reception slot 708 (which may be the transceiver 108 of the portable computing device 102), the signal may undergo significant attenuation. The reception slot 708 may pass the signal to a receiver 712, which may be the communication circuit 204, via an attenuator 710. The attenuator 710 may include resistance in wires between the reception slot 708 and the receiver 712, or an active attenuator. The signal received and/or demodulated by the receiver 712 may be significantly attenuated, such as by fifty decibels (dB), from the signal generated and/or modulated by the transceiver 702. The flow of signals may also travel in the opposite direction, from the transceiver 712, to the attenuator 710, reception slot 708, transmission slot 706, attenuator 704, and to the transceiver 702, attenuating the signal in a similar manner to that described above.

Figure 8A:
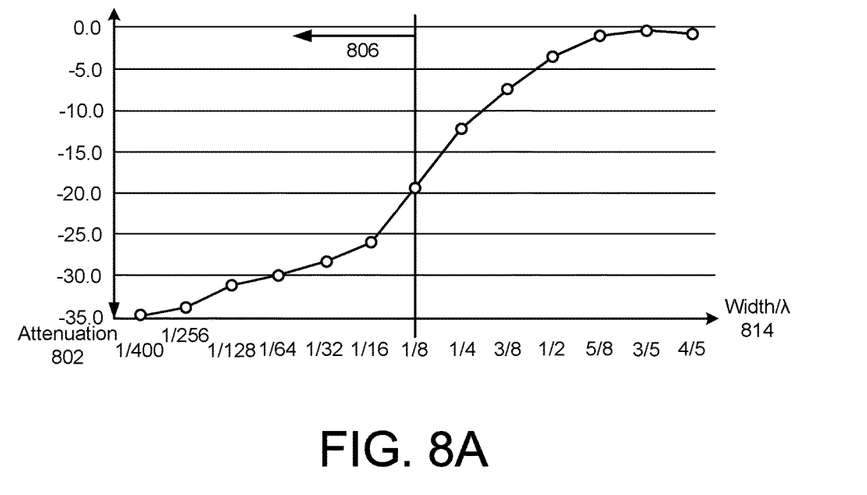
FIG. 8A shows a plot of attenuation as a function of a ratio of transceiver width to signal wavelength according to an example implementation.

FIG. 8A shows a plot of attenuation 802 as a function of a ratio of transceiver width to signal wavelength 804 according to an example implementation. As shown in FIG. 8A, the attenuation 802 decreases as the width of the transmitter increases for a given signal wavelength. When the width of the transceiver is one-eighth the wavelength or less, the signal is significantly attenuated, reducing the strength of the signal so that it should not interfere with communication between other pairs of devices.

Figure 8B:
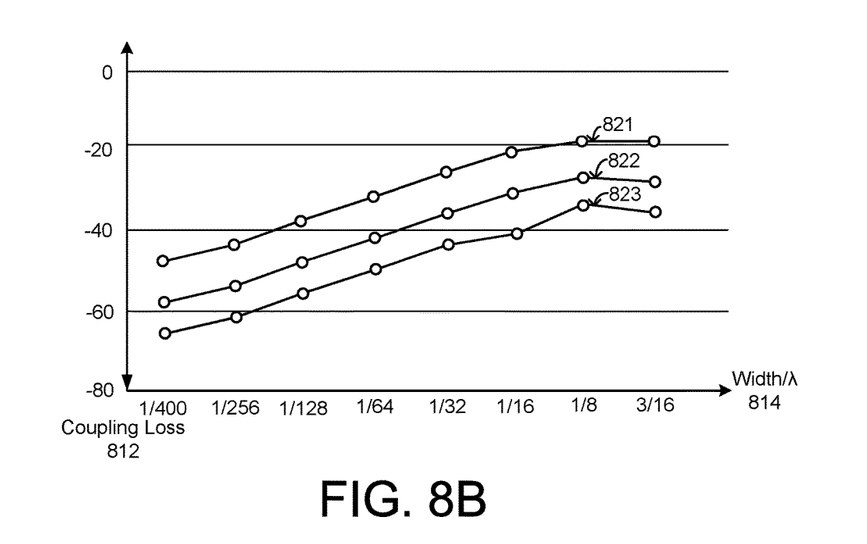
FIG. 8B shows plots of coupling loss as a function of a ratio of transceiver width to signal wavelength for different spacings between the transceivers according to an example implementation.

FIG. 8B shows plots of fringing field coupling loss 812 as a function of a ratio of transceiver width to signal wavelength 814 for different spacings 404 between the transceivers according to an example implementation. Plot 821 shows the attenuation for a spacing 404 of one millimeter, plot 822 shows the attenuation for a spacing of two millimeters, and plot 823 shows the attenuation for a spacing of three millimeters. As shown in FIG. 8B, the coupling loss increases as the spacing increases. The coupling loss also increases as the transceiver dimension (transceiver width to signal wavelength 814) decreases.

Figure 9:
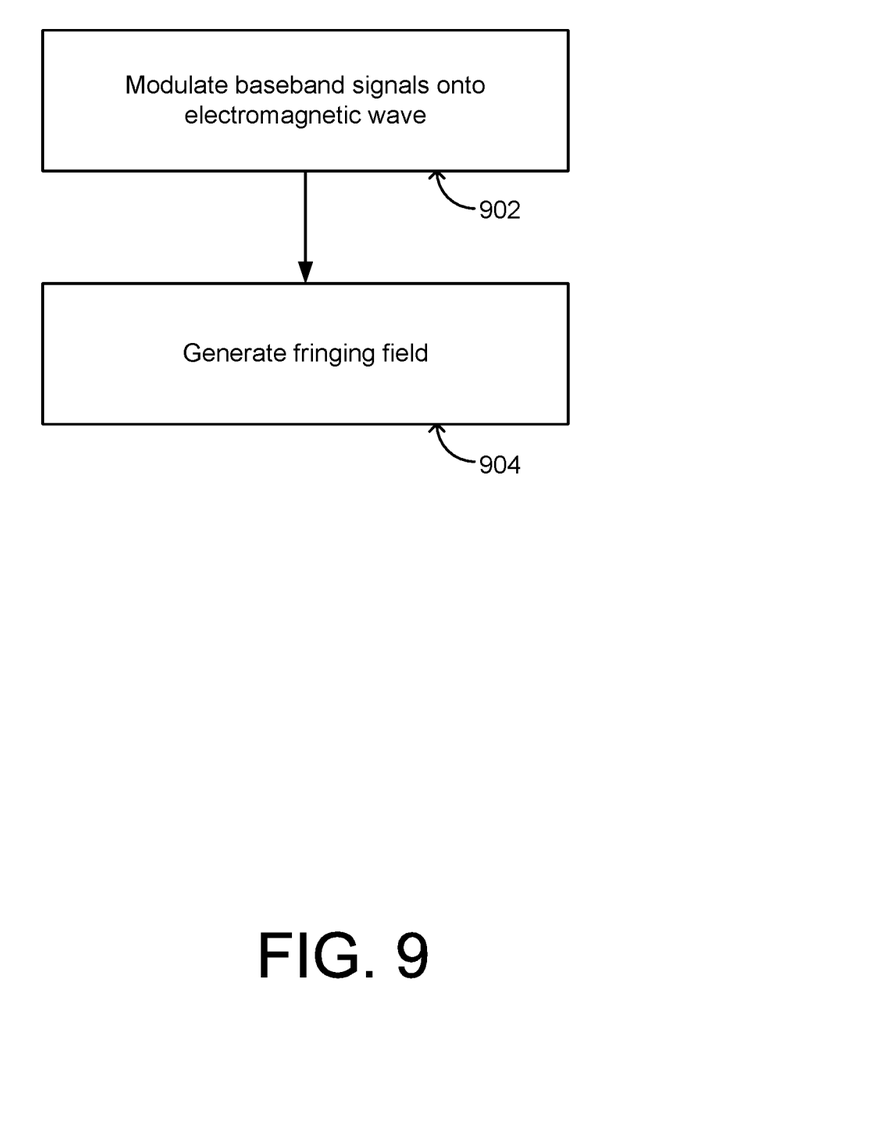
FIG. 9 is a flowchart showing a method according to an example implementation.

FIG. 9 is a flowchart showing a method according to an example implementation. The method may be performed by a portable computing device 102 or a base 110. The method may include modulating baseband signals onto an electromagnetic wave (902). The modulated signals may carry information, such as keyboard input.

The method may include generating a fringing field 406, 408, the fringing field 406, 408 including the modulated signals (904). The fringing field 406, 408 may be generated via a slot 502, loop 504, or probe 506 with a width no longer than one-eighth of the wavelength of the electromagnetic wave, by, for example, transmitting current through or around a transceiver 108, 118, such as a slot 502, loop 504, or probe 506, generating an electromagnetic wave with a wavelength that is at least eight times a width of the transceiver. The fringing field 406, 408 may be sufficiently localized that the fringing field 406, 408 is unlikely to interfere with communication by other devices and will not violate regulatory requirements. The fringing field may couple with a fringing field of another device, such as a fringing field 406 of the portable computing device 102 coupling 402 with the fringing field 408 of the base 110, as shown in FIG. 4A. The device (such as a portable computing device 102 or base 110) may communicate with the other device via the coupled fringing fields 406, 408.

Figure 10:
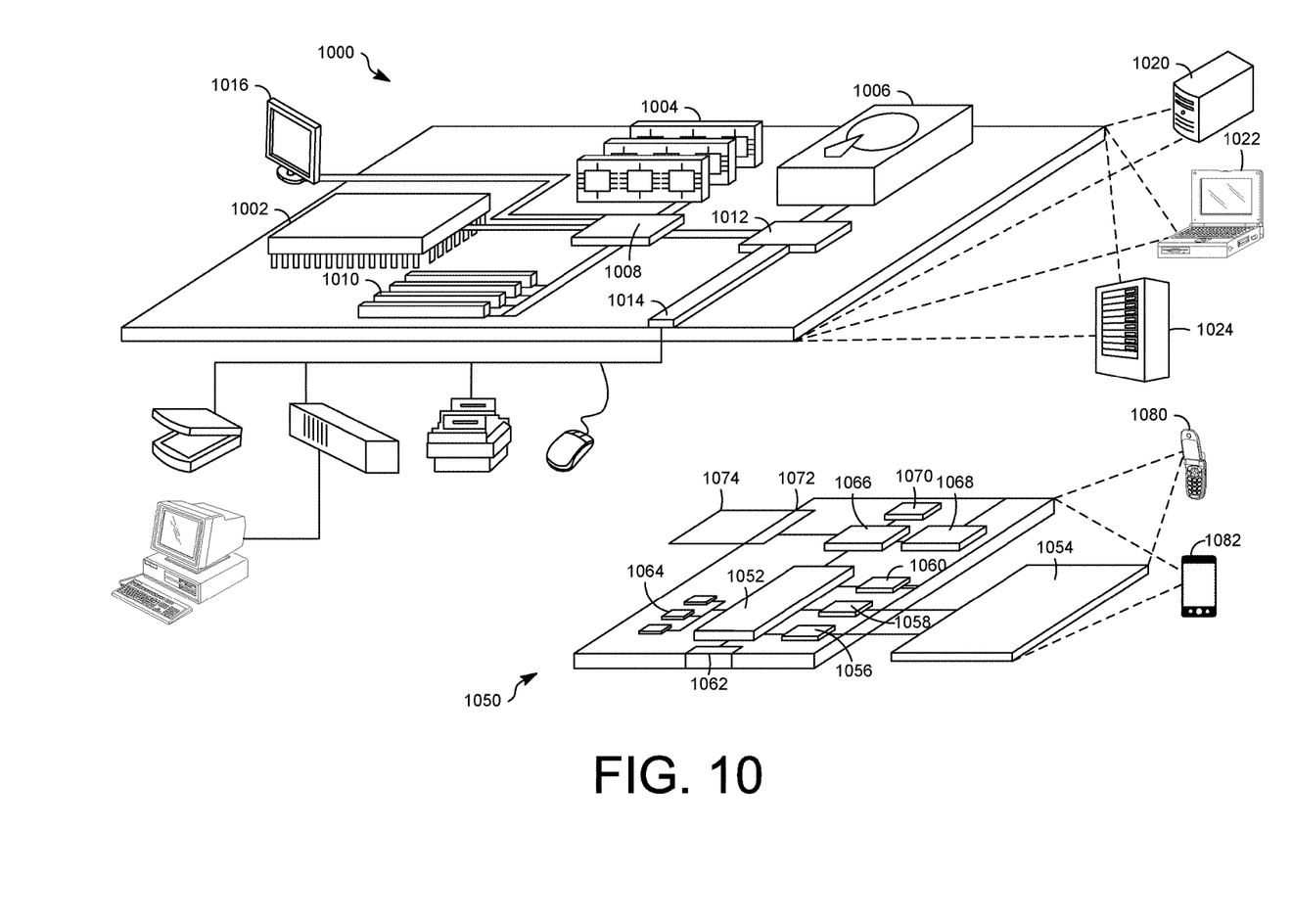
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A portable computing device comprising:
   a display;
   a frame supporting the display, at least a portion of the frame being electrically conductive, the electrically conductive portion of the frame defining a slot; and
   a communication circuit coupled to the slot, the communication circuit being configured to generate a fringing field, the fringing field including electromagnetic waves with a wavelength at least eight times a width of the slot in a widest direction of the slot.

2. The portable computing device of claim 1, wherein the wavelength is at least ten times the width of the slot in the widest direction of the slot.

3. The portable computing device of claim 1, wherein the communication circuit is configured to modulate communication signals onto the electromagnetic waves.

4. The portable computing device of claim 1, wherein the slot is on an opposite side of the frame than the display.

5. The portable computing device of claim 1, wherein the communication circuit and the slot generate the fringing field, the fringing field extending out of the slot beyond the frame.

6. The portable computing device of claim 1, further comprising at least one magnet configured to mount the portable computing device to a base.

7. The portable computing device of claim 1, wherein the wavelength is within a licensed frequency band.

8. A portable computing device comprising:
   a display;
   a frame surrounding the display;
   a communication circuit included in the frame, the communication circuit being configured to modulate signals onto electromagnetic waves; and
   a transceiver included in the frame and coupled to the communication circuit, the transceiver being configured to transmit the electromagnetic waves with the modulated signals, the transceiver having a width in a widest direction that is no more than an eighth of a wavelength of the electromagnetic waves.

9. The portable computing device of claim 8, wherein the transceiver includes a slot.

10. The portable computing device of claim 8, wherein the transceiver includes a probe.

11. The portable computing device of claim 8, wherein the transceiver includes a wire loop.

12. A base for a portable computing device, the base comprising:
    a frame;
    a keyboard supported by the frame;
    a communication circuit included in the frame, the communication circuit being configured to modulate signals onto electromagnetic waves, the signals being based on input into the keyboard; and
    a transceiver configured to transmit a fringing field with the modulated signals, the transceiver having a width in a widest direction that is no more than a eighth of a wavelength of the electromagnetic waves.

13. The base of claim 12, wherein the transceiver includes a probe.

14. The base of claim 12, wherein the transceiver includes a wire loop.

15. The base of claim 12, wherein:
    at least a portion of the frame is electrically conductive; and
    the transceiver includes a slot defined by the electrically conductive portion of the frame.

16. A method performed by a portable computing device comprising a display, a frame supporting the display and defining a slot, and a communication circuit coupled to the slot, the method comprising:
    modulating, by the communication circuit, baseband signals onto an electromagnetic wave, the electromagnetic wave having a wavelength of at least eight times a width of the slot in a widest direction of the slot; and
    generating, by the communication circuit and the slot, a fringing field, the fringing field carrying the signals modulated onto the electromagnetic wave.

* * * * *

UNITED STATES PATENT AND TRADEMARK OFFICE
CERTIFICATE OF CORRECTION

| | | |
|---|---|---|
| PATENT NO. | : 10,198,045 B1 | Page 1 of 1 |
| APPLICATION NO. | : 15/217223 | |
| DATED | : February 5, 2019 | |
| INVENTOR(S) | : Kong et al. | |

It is certified that error appears in the above-identified patent and that said Letters Patent is hereby corrected as shown below:

On the Title Page

Column 2, Item (56), under "OTHER PUBLICATIONS", Line 1, delete "(htttps://en.wikipedla.org/Wiki/Electromagnet)," and insert -- (https://en.wikipedia.org/Wiki/Electromagnet), --, therefor.

In the Claims

In Column 12, Claim 12, Line 17, delete "a eighth" and insert -- an eighth --, therefor.

Signed and Sealed this
Fifth Day of May, 2020

Andrei Iancu
*Director of the United States Patent and Trademark Office*